(12) United States Patent
Kurihara et al.

(10) Patent No.: US 11,910,110 B2
(45) Date of Patent: Feb. 20, 2024

(54) TRANSFER CONTROL DEVICE, IMAGE PROCESSING DEVICE, TRANSFER CONTROL METHOD, AND PROGRAM

(71) Applicant: Sony Interactive Entertainment Inc., Tokyo (JP)

(72) Inventors: Yosuke Kurihara, Tokyo (JP); Hiromasa Naganuma, Tokyo (JP); Masakazu Hayashi, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 17/634,048

(22) PCT Filed: Aug. 20, 2019

(86) PCT No.: PCT/JP2019/032344
§ 371 (c)(1),
(2) Date: Feb. 9, 2022

(87) PCT Pub. No.: WO2021/033252
PCT Pub. Date: Feb. 25, 2021

(65) Prior Publication Data
US 2022/0329743 A1   Oct. 13, 2022

(51) Int. Cl.
*H04N 25/50* (2023.01)
*H04N 25/713* (2023.01)
*H04N 25/71* (2023.01)

(52) U.S. Cl.
CPC .......... *H04N 25/50* (2023.01); *H04N 25/713* (2023.01); *H04N 25/745* (2023.01)

(58) Field of Classification Search
CPC .... H04N 25/50; H04N 25/713; H04N 25/745; H04N 23/71; H04N 25/134;
(Continued)

(56) References Cited

U.S. PATENT DOCUMENTS 9,389,693 B2 * 7/2016 Lee .......................... G06T 7/20
11,122,224 B2    9/2021 Suh
(Continued)

FOREIGN PATENT DOCUMENTS

JP       4437514 B2 *  3/2010  ............. H04N 19/59
JP    2013078030 A *   4/2013  ............... H04N 7/18
(Continued)

OTHER PUBLICATIONS

International Search Report for corresponding PCT Application No. PCT/JP2019/032344, 4 pages, dated Nov. 5, 2019.

*Primary Examiner* — Nhan T Tran
(74) *Attorney, Agent, or Firm* — Matthew B. Dernier, Esq.

(57) ABSTRACT

A transfer control device includes a difference identifying section which identifies, for a first and second images sequentially captured by synchronous scanning, a difference region of the second image, on the basis of an event signal indicating a change in intensity of light generated in one or a plurality of pixels of each of the first and second images during a time period from capturing of the first image to capturing of the second image; and a transfer control section which executes data transfer different between the difference region and regions other than the difference region, for the second image.

8 Claims, 5 Drawing Sheets

(58) Field of Classification Search
CPC .... H04N 17/002; H04N 19/46; H04N 19/503; H04N 19/597; H04N 23/00; H04N 25/77; H04N 19/137
See application file for complete search history.

(56) References Cited

U.S. PATENT DOCUMENTS

| | | | |
|---|---|---|---|
| 2012/0170659 A1* | 7/2012 | Chaudhury | H04N 19/36 375/E7.123 |
| 2014/0320403 A1 | 10/2014 | Lee | |
| 2018/0098082 A1* | 4/2018 | Burns | H04N 19/54 |
| 2018/0146149 A1 | 5/2018 | Suh | |

FOREIGN PATENT DOCUMENTS

| | | | | |
|---|---|---|---|---|
| JP | 2013078030 A | 4/2013 | | |
| JP | 2014535098 A | 12/2014 | | |
| JP | 2018085725 A | 5/2018 | | |
| JP | 2019062267 A | * 4/2019 | | H04N 1/413 |
| JP | 2019062267 A | 4/2019 | | |

* cited by examiner

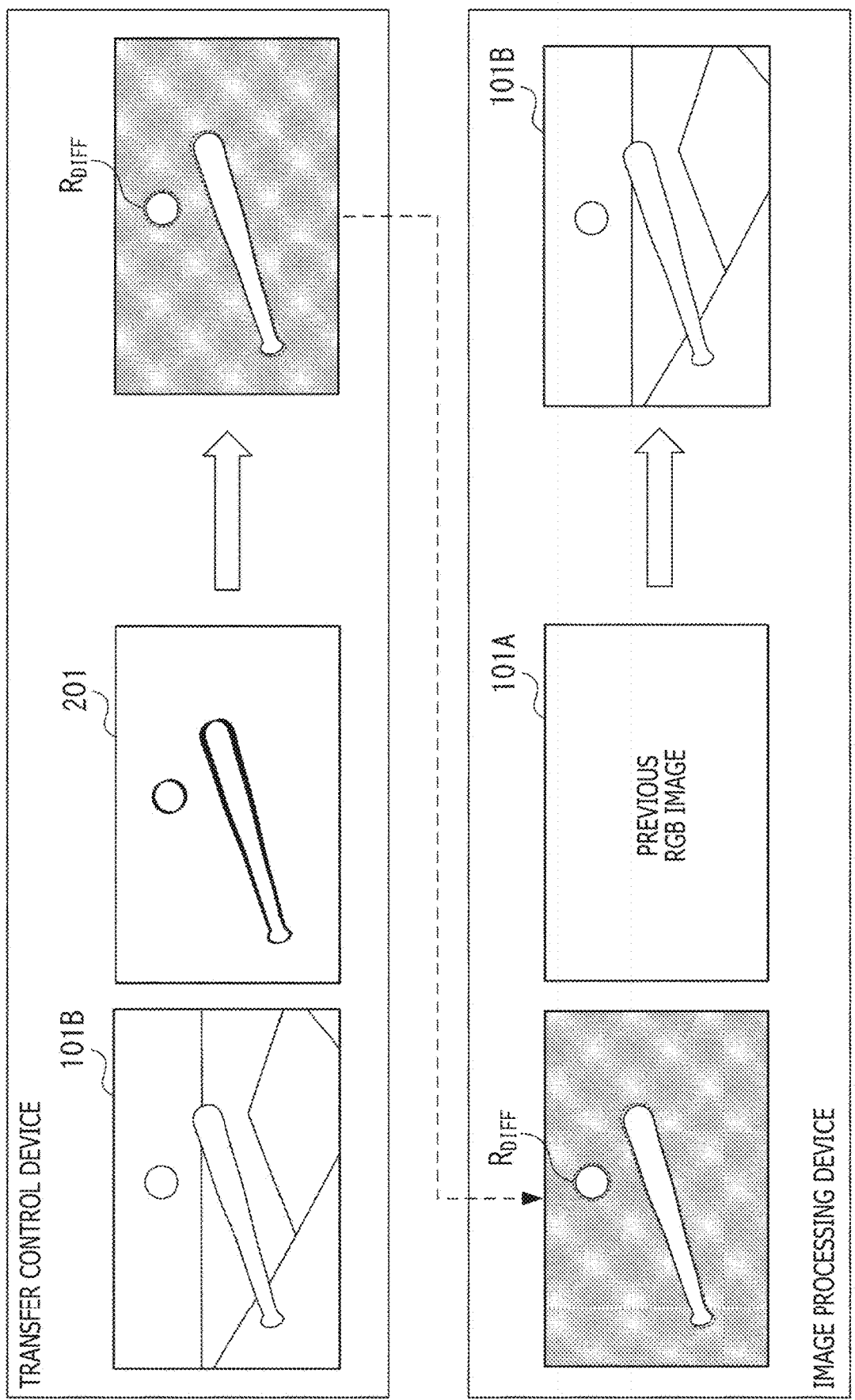

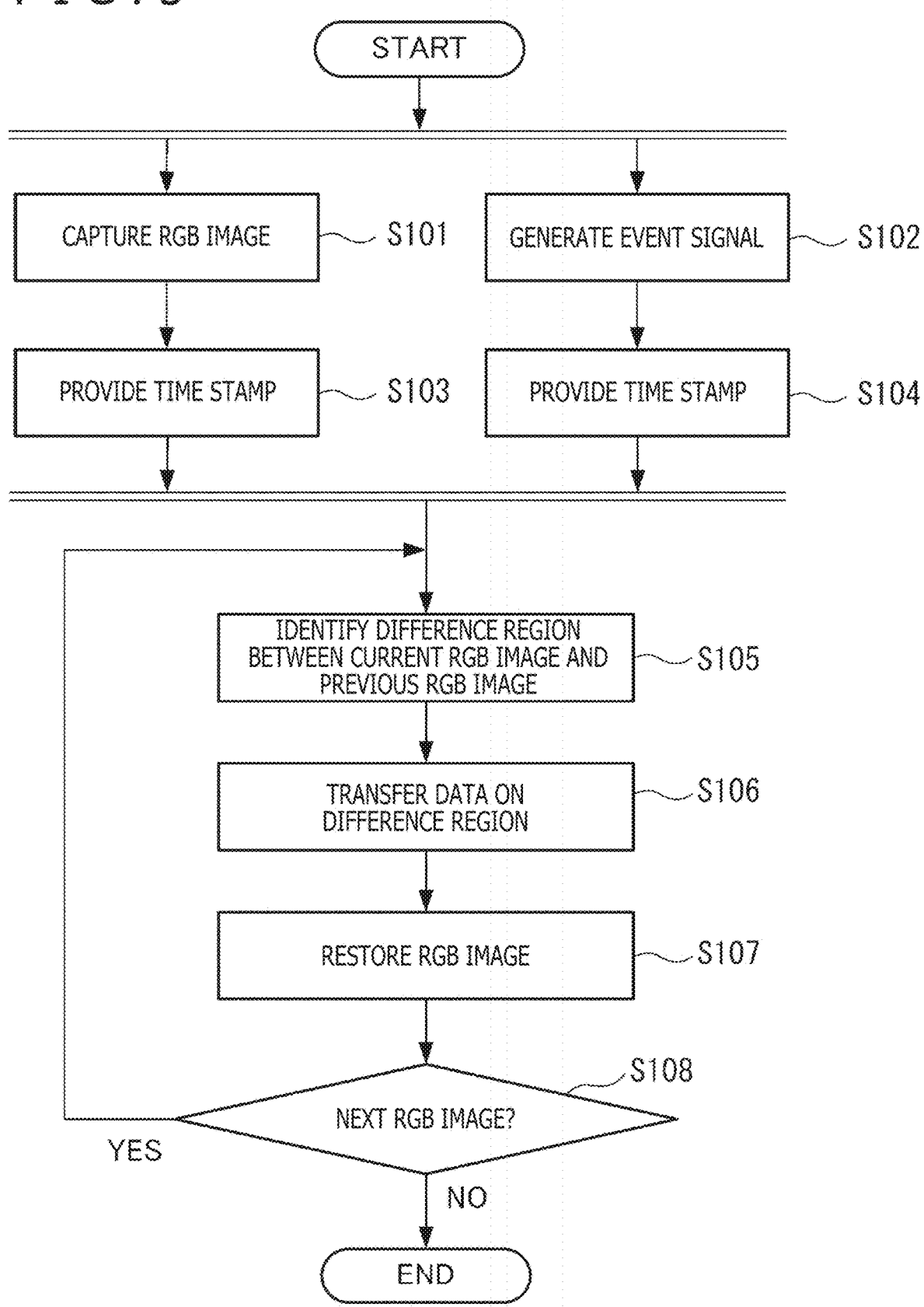

TRANSFER CONTROL DEVICE, IMAGE PROCESSING DEVICE, TRANSFER CONTROL METHOD, AND PROGRAM

TECHNICAL FIELD

The present invention relates to a transfer control device, an image processing device, a transfer control method, and a program.

BACKGROUND ART

There has been known an event driven vision sensor in which a pixel detects a change in intensity of light to be incident to generate a signal asynchronously in time. Such an event driven vision sensor is advantageous in that the event driven vision sensor is able to operate at low power and high speed, compared to a frame-based vision sensor that scans all pixels for predetermined cycles, specifically, an image sensor such as a CCD (Charge Coupled Device) or a CMOS (Complementary Metal Oxide Semiconductor). A technique relating to such an event-driven vision sensor is cited in PTL 1 and PTL 2, for example.

CITATION LIST

Patent Literature

[PTL 1] JP 2014-535098T [PTL 2] JP 2018-085725A

SUMMARY

Technical Problem

However, regarding the event driven vision sensor, although such advantages described above have been known, it is hard to say that a method of using the event driven vision sensor in combination with another device, for example, a frame-based vision sensor, has been sufficiently proposed.

In view of this, an object of the present invention is to provide a transfer control device, an image processing device, a transfer control method, and a program capable of obtaining advantageous effects by use of an event driven vision sensor in combination with a frame-based vision sensor.

Solution to Problem

According to an aspect of the present invention, there is provided a transfer control device including a difference identifying section which identifies, for a first and second images sequentially captured by synchronous scanning, a difference region of the second image, on the basis of an event signal indicating a change in intensity of light generated in one or a plurality of pixels of each of the first and second images during a time period from capturing of the first image to capturing of the second image, and a transfer control section which executes data transfer different between the difference region and regions other than the difference region, for the second image.

According to another aspect of the present invention, there is provided an image processing device including a data receiving section which receives, for a first image captured by synchronous scanning and a second image captured captured subsequent to the first image by synchronous scanning, data on a difference region of the second image with respect to the first image; and an image restoring section which restores the entire second image on the basis of data on the entire first image and the data on the difference region.

According to a further aspect of the present invention, there is provided a transfer control method including a step of identifying, for a first and second images sequentially captured by synchronous scanning, a difference region of the second image, on the basis of an event signal generated in response to a change in intensity of light generated in one or a plurality of pixels of each of the first and second images during a time period from capturing of the first image to capturing of the second image, and a step of executing data transfer different between the difference region and regions other than the difference region, for the second image.

According to a still further aspect of the present invention, there is provided a program causing a computer to realize a function of identifying, for a first and second images sequentially captured by synchronous scanning, a difference region of the second image, on the basis of an event signal generated in response to a change in intensity of light generated in one or a plurality of pixels of each of the first and second images during a time period from capturing of the first image to capturing of the second image, and a function of executing data transfer different between the difference region and regions other than the difference region, for the second image.

BRIEF DESCRIPTION OF DRAWINGS

FIG. 4 is a diagram for explaining an example of transfer control and image restoration according to the embodiment of the present invention.

FIG. 5 is a flow chart indicating an example of a transfer control method according to the embodiment of the present invention.

DESCRIPTION OF EMBODIMENTS

Hereinafter, preferred some embodiments of the present invention will be described in detail with reference to the attached drawings. Note that, in the present specification and the drawings, the same reference signs are provided to constituent elements with substantially the same functional configurations, and the description will not be repeated.

Figure 1:
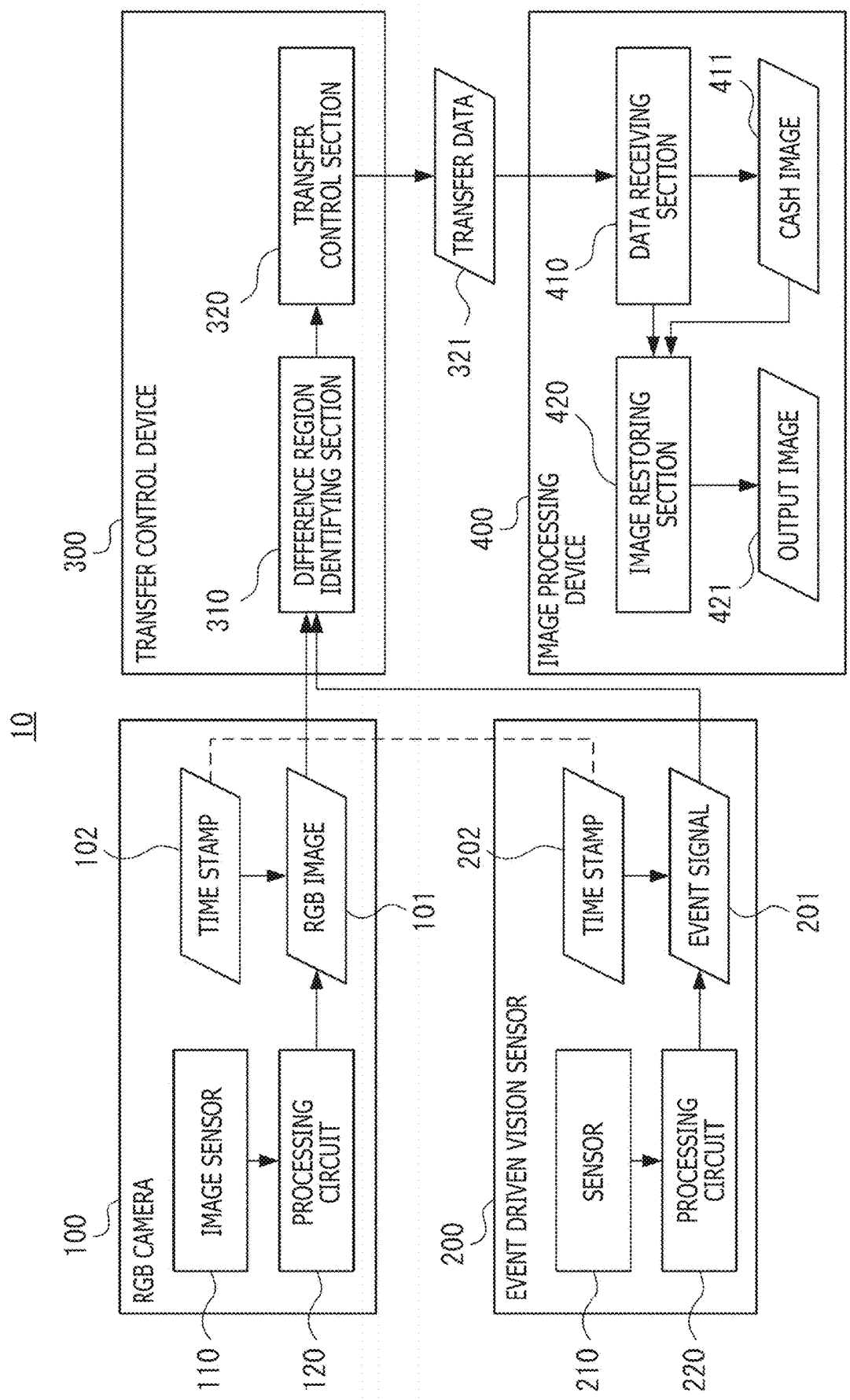
FIG. 1 is a block diagram illustrating a schematic configuration of a system according to an embodiment of the present invention.

FIG. 1 is a block diagram illustrating a schematic configuration of a system according to an embodiment of the present invention. A system 10 includes an RGB (Red-Green-Blue) camera 100, an EDS (Event Driven Sensor) 200, a transfer control device 300, and an image processing device 400, as illustrated in FIG. 1.

The RGB camera 100 is an example of a first vision sensor that captures an image by synchronously scanning, and includes an image sensor 110, and a processing circuit 120 connected to the image sensor 110. The image sensor 110 captures the RGB image 101 by synchronously scanning all pixels at predetermined cycles or at a predetermined timing depending on a user operation, for example. In the present embodiment, the RGB image 101 may be an image captured sequentially at a predetermined frame rate, specifically a series of frame images constituting a moving image, for example. The processing circuit 120 converts the RGB image 101 to a format suitable to be stored and transmitted, for example. In addition, the processing circuit 120 provides a time stamp 102 to the RGB image 101.

The EDS 200 is an example of a second vision sensor that generates an event signal when a sensor detects a change in intensity of light, and includes sensors 210 constituting a sensor array, and a processing circuit 220 connected to the sensors 210. The sensors 210 each includes a light receiving element and generates an event signal 201 when detecting a change in intensity of light to be incident, more specifically, a change in luminance. Since the sensor 210 which does not detect a change in intensity of light to be incident does not generate the event signal 201, the event signal 201 is generated asynchronously in time in the EDS 200. The event signal 201 output through the processing circuit 220 includes identification information regarding each sensor 210 (for example, a position of a pixel), a polarity of a luminance change (higher or lower), a time stamp 202.

Here, in the present embodiment, the time stamp 102 provided to the RGB image 101 and the time stamp 202 provided to the event signal 201 are synchronized with each other. More Specifically, for example, by providing time information used for generating the time stamp 202 in the EDS 200 to the RGB camera 100, it is possible to synchronize the time stamp 102 with the time stamp 202. Alternatively, in a case in which time information for generating the time stamps 102 and 202 are independent of each other in the RGB camera 100 and the EDS 200, respectively, with a time at which a particular event (for example, a change of a subject all over the image) has occurred set as a reference, an offset amount of the time stamp is calculated, so that the time stamp 102 and the time stamp 202 can be synchronized with each other thereafter.

Figure 2:
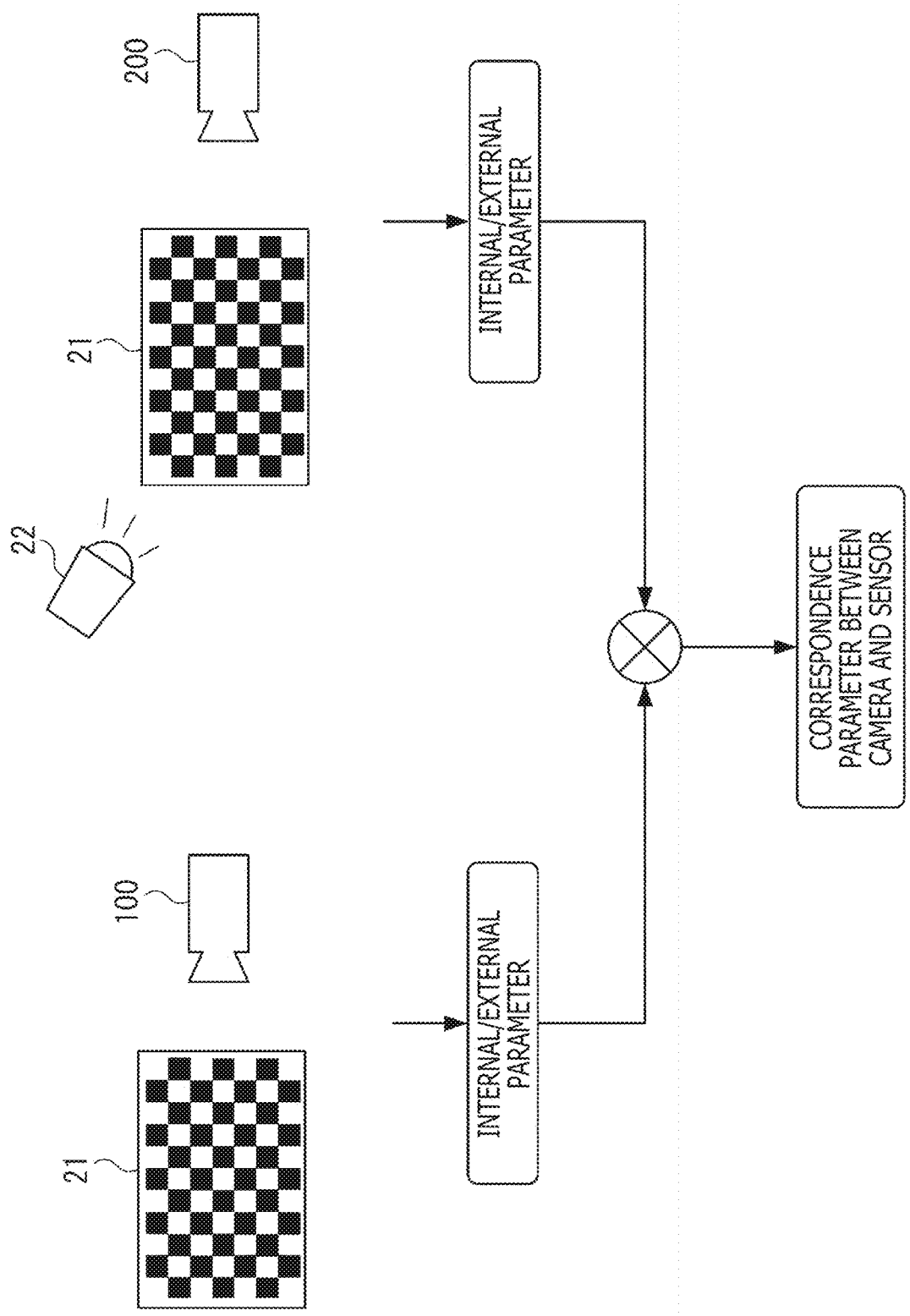
FIG. 2 is a diagram for schematically explaining calibration between a camera and a sensor according to the embodiment of the present invention.

Moreover, in the present embodiment, through a calibration procedure of the RGB camera 100 and the EDS 200 that is executed in advance, the sensors 210 of the EDS 200 are made to correspond to one or a plurality of pixels of the RGB image 101, and the event signal 201 is generated in response to a change in intensity of light in the one or the plurality of pixels. More specifically, as illustrated in FIG. 2, for example, the RGB camera 100 and the EDS 200 capture a calibration pattern 21 common to each other (in the case of the EDS 200, it is possible to capture the calibration pattern by flickering the entire region of the calibration pattern 21 by use of a light source 22, for example), and correspondence parameters between the camera and the sensor are calculated by respective internal parameters and external parameters of the RGB camera 100 and the EDS 200, so that the sensors 210 can be made to correspond to the one of the plurality of pixels of the RGB image 101.

Figure 3:
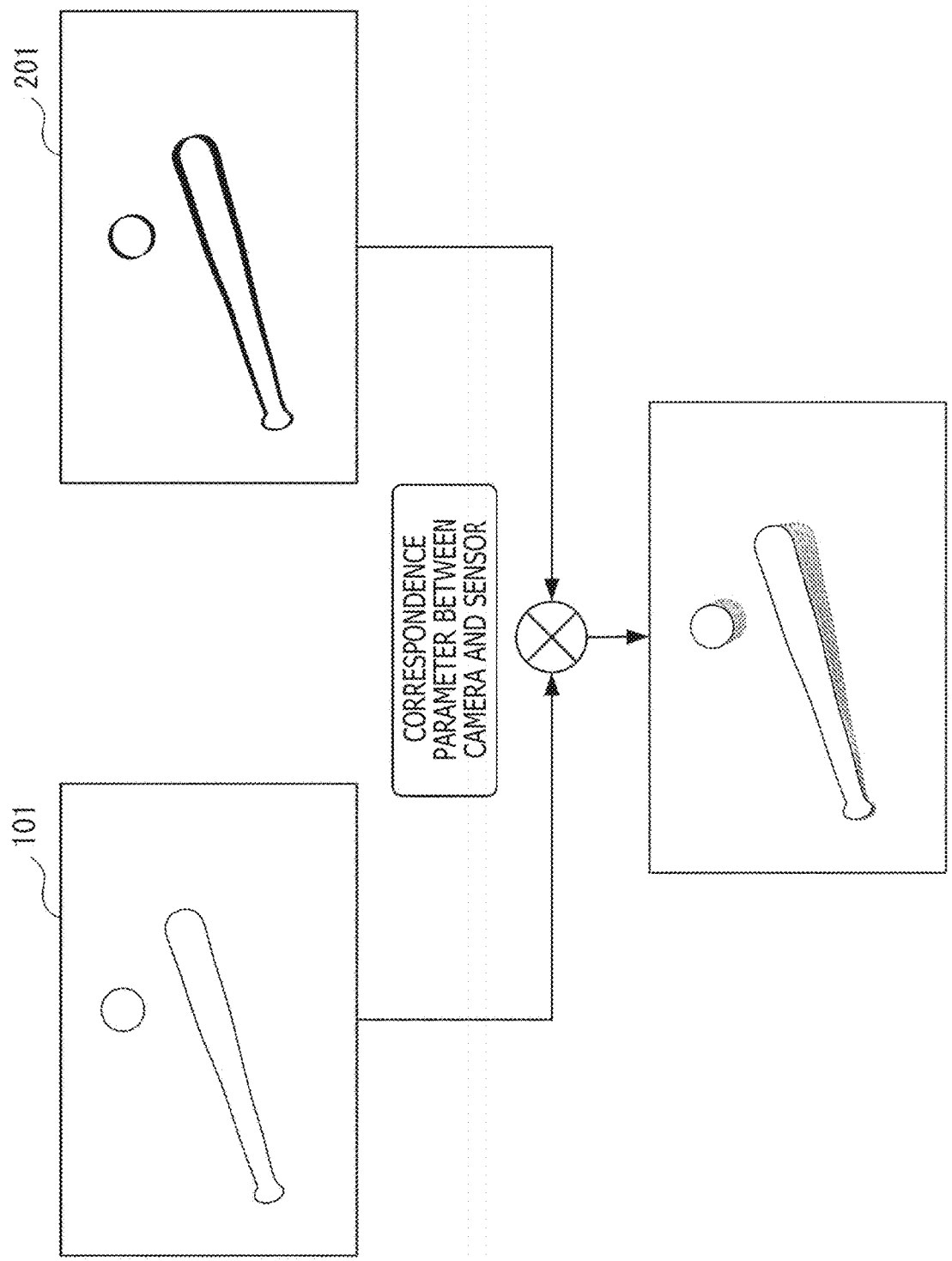
FIG. 3 is a diagram for schematically explaining matching between an image and an event signal according to the embodiment of the present invention.

FIG. 3 is a diagram for explaining an example of matching between the image and the event signal according to the embodiment of the present invention. In the example illustrated in the figure, there are presented the RGB image 101 captured by the RGB camera 100 and an image in which the event signal 201 output from the EDS 200 at a time at which to correspond to scanning of the RGB image 101 is arranged at a position of the corresponding pixel. The correspondence parameters between the camera and the sensor as described above with reference to FIG. 2 are calculated in advance, and accordingly, a coordinate system of the event signal 201 is converted to a coordinate system of the RGB image as illustrated in FIG. 3, making it possible to overlay the event signal 201 on the RGB image 101.

With reference to FIG. 1 again, the transfer control device 300 is implemented by a computer including a communication interface, a processor, and a memory, for example, and includes functions of a difference region identifying section 310 and a transfer control section 320 which are achieved by the processor being operated according to a program stored in the memory or received through the communication interface. The functions of the individual sections will be described in more detail below.

The difference region identifying section 310 identifies a difference region of the RGB image 101 on the basis of the event signal 201. In the present embodiment, the RGB image 101 includes at least two images (first and second images) captured sequentially. The difference region identifying section 310 identifies a difference region in an image which is captured later (second image) from an image which is captured earlier (first image) on the basis of the event signal 201 indicating a change in intensity of light which has occurred in the one or the plurality of pixels of each of the images during capturing of these images. A time during capturing the images can be identified as a time from a start of scanning of the first image to a start of scanning of the second image, for example, by use of the time stamp 202. For example, the difference region identifying section 310 identifies a pixel region that has a change in intensity of light during capturing of these two images as a difference region. At this time, the difference region identifying section 310 may set a lower limit in a magnitude of the difference region, thereby preventing a difference region in a bright dot-like shape from being generated due to a noise.

The transfer control section 320 executes data transfer of the RGB image 101 by use of the difference region identified by the difference region identifying section 310. More specifically, the transfer control section 320 executes data transfer different between the difference region of the RGB image 101 (the second image) that is captured later in time series and regions other than the difference region. Here, execution of data transfer different in the two regions includes executing data transfer in one region and not executing data transfer in the other region. In other words, the transfer control section 320 may execute data transfer in the difference region of the second image and may not execute data transfer in the regions other than the difference region. Alternatively, the transfer control section 320 may execute data transfer in the difference region of the second image in a first mode and may execute data transfer in the regions other than the difference region in a second mode having a higher compression ratio than the first mode.

In the present embodiment, in the transfer control device 300, the difference region identifying section 310 executes data transfer only in the difference region identified on the basis of the event signal 201 or executes data transfer only in the difference region in a mode having a lower compression ratio. Thus, for example, in a case in which a motion of a subject occurs in part of an image, it is possible to reduce a data transfer amount of the RGB image 101 (the second image) that is captured later in time series. As a technique for reducing a data transfer amount of an image that is captured later by use of an image that is captured earlier, for example, a technique of calculating a motion vector by comparing sequential images has been known. However, in the present embodiment, a pixel region in which a change in intensity of light has occurred is identified as the difference region due to the event signal 201, and accordingly, a calculation amount is small, compared to a case in which the motion vector is calculated, making it possible to reduce the data transfer amount with a simpler process.

Note that, in the present embodiment, the transfer control device 300 executes transfer of transfer data 321 to the image processing device 400 that is an external device. However, in another example, the transfer control device may execute data transfer to a memory incorporated therein. While reduction in transfer amount makes it possible to enhance the speed of communication in the data transfer to the external device, reduction in transfer amount in the data transfer to the memory incorporated in the transfer control device enables a memory capacity to be saved.

The image processing device 400 is implemented by a computer including a communication interface, a processor, and a memory, for example, and includes the functions of the data receiving section 410 and the image restoring section 420 which are achieved by the processor being operated according to a program stored in the memory or received through the communication interface. The functions of the individual sections will be described in more detail below.

The data receiving section 410 receives the transfer data 321 from the transfer control device 300. In the present embodiment, the transfer data 321 includes the entire data of the RGB image 101 (the first image) that is captured earlier in time series and data regarding the difference region of the RGB image 101 (the second image) that is captured later in time series, from the first image. Here, as described above, in a case in which the transfer control section 320 executes data transfer in the difference region and does not execute data transfer in the regions other than the difference region, the transfer data 321 includes only data regarding the difference region for the second image. Alternatively, in a case in which data transfer is executed only in the difference region in a mode having a lower compression ratio, the transfer data 321 includes data on the entire first image and data on the difference region of the second image having a lower compression ratio and includes data on the regions other than the difference regions of the second image having a higher compression ratio.

The image restoring section 420 restores the entire RGB image 101 (the second image) the data on the difference region of which has been transferred on the basis of the transfer data 321 received by the data receiving section 410, to obtain an output image 421. For example, in a case in which the transfer data 321 includes only data on the difference region for the second image, the image restoring section 420 overwrites the RGB image 101 (first image) in which the data on entire image has been transferred earlier with the data on the difference region, thereby restoring the second image. In addition, in a case in which the transfer data 321 includes the entire first image and data with a lower compression ratio for the difference region of the second image and data with a higher compression ratio for the regions other than the difference region of the second image, the image restoring section 420 overwrites the data on the first image with the data on the difference region, thereby restoring the second image with a lower compression ratio as a whole. Here, the data on the RGB image 101 (the first image) that has been transferred earlier may be stored in the memory of the image processing device 400, as a cash image 411.

In the present embodiment, in the image processing device 400, the image restoring section 420 restores the entire second image on the basis of the data on the entire first image and the data on the difference region of the second image. The restoring process of the second image may be a process of overwriting of data as described above, for example, and accordingly, the rescoring process is low in calculation amount, in comparison with a case in which a motion vector is calculated as described above, for example, so that it is possible to restore the entire second image with a simpler process.

FIG. 4 is a diagram for explaining an example of transfer control and image restoration according to the embodiment of the present invention. In the example illustrated in FIG. 4, in the transfer control device 300, the difference region identifying section 310 identifies a difference region $R_{DIFF}$ of an RGB image 101B (the second image described above) on the basis of the event signal 201. In the example illustrated in figure, the transfer control section 320 transfers only data on the difference region $R_{DIFF}$ for the second image to the image processing device 400, as transfer data 321. In the image processing device 400, the data receiving section 410 receives the transfer data 321, and the image restoring section 420 restores the entire RGB image 101B (the second image) on the basis of the data on the difference region $R_{DIFF}$ included in the transfer data 321 and a previous RGB image 101A that has been transferred earlier (the first image described above).

FIG. 5 is a flow chart indicating an example of a transfer control method according to the embodiment of the present invention. In the example indicated in the figure, the RGB camera 100 captures the RGB image 101 (step S101), while at the same time, the EDS 200 generates the event signal 201 (step S102). Note that the step S102 of generating the event signal 201 is executed only in a case in which the sensor 210 corresponding to one or a plurality of pixels of the RGB image 101 detects a change in intensity of light. The RGB image 101 is provided with the time stamp 102 (step S103), and the event signal is provided with the time stamp 202 (step S104).

Next, the process in the transfer control device 300 is executed. First, the difference region identifying section 310 identifies, for the RGB image 101, the difference region between the previous image (the first image) that has been captured earlier in time series and the current image (the second image) that is an object to be processed (step S105), on the basis of the event signal 201. Next, the transfer control section 320 transfers data on the difference region (step S106). In the example illustrated in figure, the transfer data 321 is transferred to the image processing device 400, and the image restoring section 420 in the image processing device 400 restores the entire RGB image 101 (the second image) on the basis of the data on the entire first image and the data on the difference region of the second image (step S107). In a case in which the RGB image 101 is a series of frame images constituting a moving image, if there is an RGB image 101 in the next frame, processes in steps S105 to S107 are repeated (although processes in steps S101 to S104 are also repeated, the processes in steps S101 to S104 may not necessarily be executed in the same cycle as the processes in steps S105 to S107) (step S108), and accordingly, it is possible to effectively reduce the data transfer amount of the moving image. At this time, the second image restored in a certain frame, is used as the first image when the image in the next frame is restored.

While some embodiments of the present invention have been described above in detail with reference to the attached drawings, the present invention is not limited to the examples. It is apparent that those with normal knowledge in the technical field of the present disclosure can make various changes or modifications within the scope of the technical idea described in the claims, and it is understood that the changes and the modifications obviously belong to the technical scope of the present invention.

REFERENCE SIGNS LIST

10: System
100: RGB camera
101, 101A, 101B: RGB image
102: Time stamp
110: Image sensor
120: Processing circuit
201: Event signal
202: Time stamp
210: Sensor
220: Processing circuit
300: Transfer control device
310: Difference region identifying section
320: Transfer control section
321: Transfer data
400: Image processing device
410: Data receiving section
411: Cash image
420: Image restoring section
421: Output image
$R_{DIFF}$: Difference region

The invention claimed is:

1. A transfer control device comprising:
a difference identifying circuit which operates to identify, for a first and second images sequentially captured by synchronous scanning, a difference region of the second image, on a basis of an event signal indicating a change in intensity of light generated in one or a plurality of pixels of each of the first and second images during a time period from capturing of the first image to capturing of the second image; and
a transfer control circuit which operates to execute data transfer differently between the difference region and regions other than the difference region, for the second image,
wherein when the different data transfer results in an image being restored using data of the first image and data of the difference region, the difference identifying circuit operates to identify, for a subsequent image captured by synchronous scanning, a difference region of the subsequent image with respect to the restored image.

2. The transfer control device according to claim 1, wherein the transfer control circuit operates to execute data transfer in the difference region and to not execute data transfer in the regions other than the difference region, for the second image.

3. The transfer control device according to claim 1, wherein the transfer control circuit operates to execute data transfer in the difference region in a first mode and to execute data transfer in the regions other than the difference region in a second mode having a higher compression ratio than the first mode, for the second image.

4. The transfer control device according to claim 1, wherein the transfer control circuit operates to execute data transfer to an external device.

5. The transfer control device according to claim 1, wherein the transfer control circuit executes data transfer to a memory included in the transfer control device.

6. An image processing device comprising:
a data receiving circuit which operates to receive, for a first image captured by synchronous scanning and a second image captured subsequent to the first image by synchronous scanning, data on a difference region of the second image with respect to the first image, the first and second images being immediately sequential frames of a captured video in which the images and additional frames are captured at a constant time interval; and
an image restoring circuit which operates to restore the entire second image on a basis of data on the entire first image and the data on the difference region,
wherein when the different data results in an image being restored using data of the first image and data of the difference region, the data receiving circuit operates to receive, for a subsequent image captured by synchronous scanning, a difference region of the subsequent image with respect to the restored image.

7. A transfer control method comprising:
identifying, for a first and second images sequentially captured by synchronous scanning, a difference region of the second image, on a basis of an event signal generated in response to a change in intensity of light generated in one or a plurality of pixels of each of the first and second images during a time period from capturing of the first image to capturing of the second image; and
executing data transfer differently between the difference region and regions other than the difference region, for the second image,
wherein when the different data transfer results in an image being restored using data of the first image and data of the difference region, the identifying includes identifying, for a subsequent image captured by synchronous scanning, a difference region of the subsequent image with respect to the restored image.

8. A non-transitory, computer readable storage medium containing a program, which when executed by a computer, causes the computer to perform a transfer control method by carrying out actions, comprising:
identifying, for a first and second images sequentially captured by synchronous scanning, a difference region of the second image, on a basis of an event signal generated in response to a change in intensity of light generated in one or a plurality of pixels of each of the first and second images during a time period from capturing of the first image to capturing of the second image; and
executing data transfer differently between the difference region and regions other than the difference region, for the second image,
wherein when the different data transfer results in an image being restored using data of the first image and data of the difference region, the identifying includes identifying, for a subsequent image captured by synchronous scanning, a difference region of the subsequent image with respect to the restored image.

* * * * *